April 28, 1942.  G. G. SHELDON  2,281,081

ELECTROMAGNET MOTOR

Filed Nov. 6, 1940    2 Sheets-Sheet 1

Inventor
Garnell G. Sheldon

By Charles W. Dake
Attorney

April 28, 1942.  G. G. SHELDON  2,281,081
ELECTROMAGNET MOTOR
Filed Nov. 6, 1940   2 Sheets—Sheet 2

Inventor
Garnett G. Sheldon
By
Charles W. Dake
Attorney

Patented Apr. 28, 1942

2,281,081

UNITED STATES PATENT OFFICE 2,281,081

ELECTROMAGNET MOTOR

Garnett G. Sheldon, Ferrysburg, Mich.

Application November 6, 1940, Serial No. 364,506

3 Claims. (Cl. 172—36)

My present invention relates to improvements in motors and particularly to electromagnet motors wherein a plurality of permanent magnets of high magnetic density cooperate in conjunction with a plurality of electrically energized magnets in producing rotary motion of a power drive shaft and thereby delivers power to a driven mechanism; and the objects of improvement are, first, to provide a motor that will be operable by the attraction and the repulsion of a plurality of permanent magnets in conjunction with a plurality of electrically energized magnets; second, to produce a motor of the class described that will be simple in construction and therefore readily understood; third, to provide a motor of the class described that will be readily understood and therefore easily repaired; and fourth, to provide a motor operable by the attraction and repulsion of permanent and electrically energized magnets.

I attain these named objects and such other objects as appear from a perusal of the following description, when the said description is reviewed in connection with the accompanying drawings, in which.

Throughout the drawings, similar numerals refer to similar parts and elements of my improved motor, and referring thereto.

Figure 1:
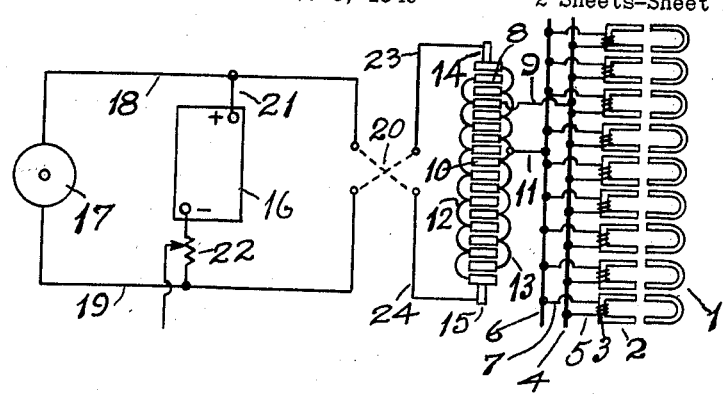
Figure 1 is a diagrammatic view of the general arrangement of the parts comprising my improved motor.
Figure 2:
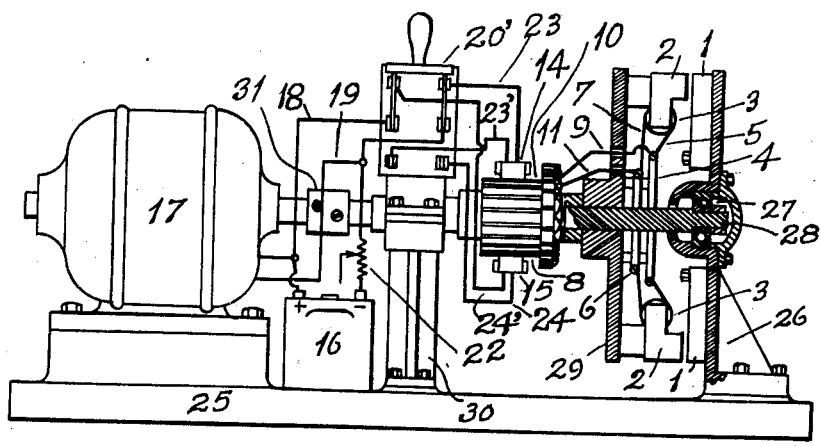
Figure 2 is a side elevation of my motor, the said view showing the structure of the motor in part section in order that the parts thereof, including the magnets and electrical circuits may be easily and clearly described.
Figure 3:
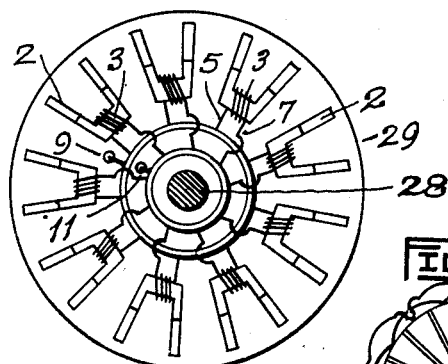
Figure 3 is an elevation view of the electromagnet support in which is shown the arrangement of the electromagnets mounted thereon and the electrical circuit associated therewith.
Figure 4:
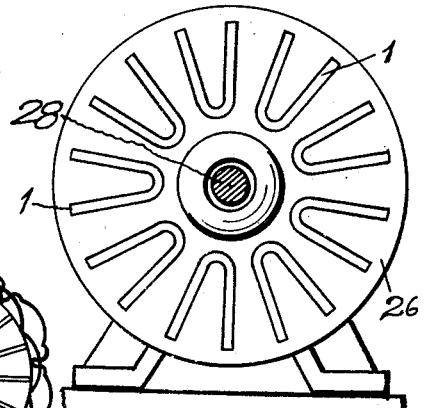
Figure 4 is an elevation view of the permanent magnet support showing the permanent magnets secured thereto.
Figure 5:
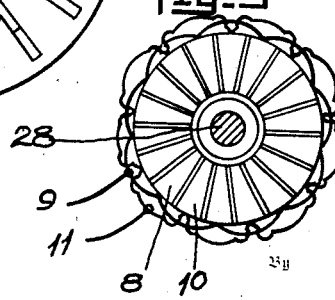
Figure 5 is an elevation view of the commutator end, in which are shown the connections extending from bar to bar, each series comprising the commutator.
Figure 6:
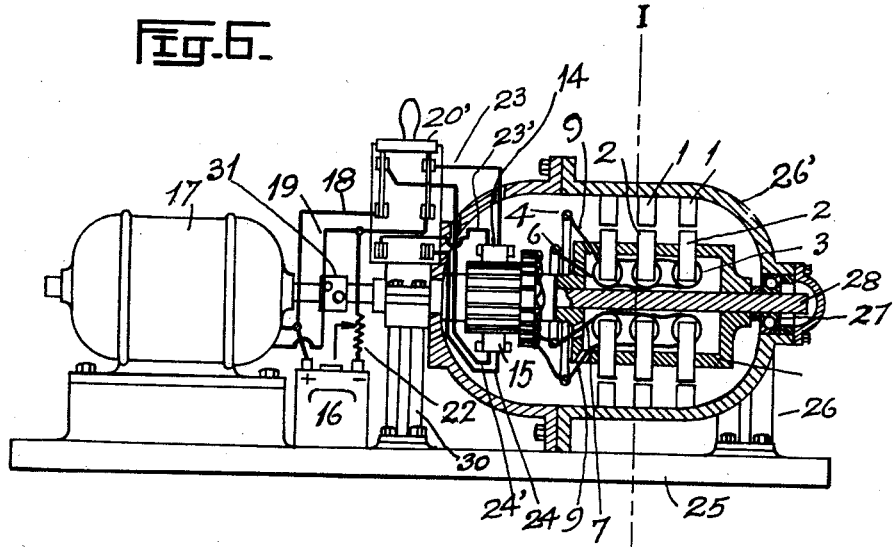
Figure 6 is a side elevation view of an alternate assembly of my improved motor from that shown in Figure 2. The view shows the structure of the motor partly in section in order that the parts thereof may be referred to and clearly described.
Figure 7:
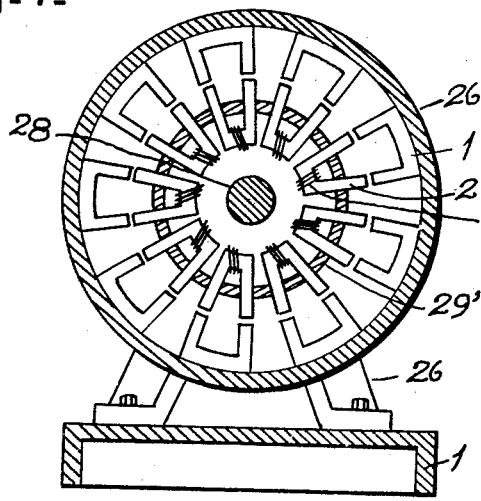
Figure 7 is a cross-section view of my motor as taken on line I—I of Figure 6, the view illustrating the arrangement of the magnets 25 as when the motor is of the construction shown in Figure 6.

Numeral 1 refers to a plurality of permanent magnets having a high magnetic flux saturation and the property of retaining said flux indefinitely. These permanent magnets are arranged in circular formation and secured to a stationary support. Numeral 2 refers to a plurality of electromagnets, that is, magnets that are energized by passing a current of electricity around their yoke portion. The poles of both the permanent magnets and of these electromagnets extend outwardly and in close opposed relation to each other. The electromagnets are provided with energizing coils 3 surrounding their yoke portion, the said coils being connected with the electrical distributer ring 4 by lead wires 5 at one of their ends, and to the electrical distribution ring 6 at their other end by lead wires 7.

The distribution ring 4 is connected to the commutator bar series 8 by lead wire 9, and the distribution ring 6 to the commutator bar series 10 by lead wire 11. The said commutator bars are arranged in two series, namely, series 8 and series 10, in which all of the bars of series 8 are connected together by jump-over leads 12, and the bars of series 10 by jump-over leads 13, the bars of the two series alternating in such a manner that the bars of one series, when the motor is operating in one direction, will receive the electric current before it passes to the magnet energizing coils, and the bars of the other series will receive the electric current after it has passed through the said magnet energizing coils, which is the reverse when the motor is rotating in the opposite direction.

Brushes 14 and 15 transmit the electric current to and from the two commutator bar series through which the current of electricity flow alternates, that is, the electric current passes in opposite directions through the bars of each series, which are insulated from each other; one series delivering the electric current through lead wires to the magnet energizing coils and the other receiving the electric current from the said coils. By reversing the flow of electric current, a reversal in direction of rotation of the rotative parts of the motor is accomplished, as when the current flows in one direction in the magnet coils, the magnets are energized to one polarization and when the electric current flows in the opposite direction in the magnet coils, the magnets will be energized to the opposite polarization.

The source of electricity for starting the motor may be the storage battery 16, or a direct current dynamo designated as 17, driven by any source of power but preferably the motor comprising a portion of my improved motor. When starting, the storage battery forms the source of electricity. After the motor is in motion, the dynamo 17 is the source from which the electric current is supplied through wire leads 18 and 19 extending from the dynamo 17 to the reverse switch 20, with the storage battery interposed between the lead wires 18 and 19 which is connected to the lead 18 by lead 21, and to lead wire 19 by adjustable resistance 22. Lead wires 23 and 24 conduct the electric current from the reverse switch to the brushes 14 and 15, whereby the electricity is delivered to and received from the bar series of the commutator. Leads 23' and 24' serve as the leads 23 and 24 when the motor is rotating in the reverse to that before described, and the reverse switch is employed for reversing the motor. Reversing of the motor can also be accomplished by moving the brushes 14 and 15 until they deliver electric current to the opposite commutator bar series from the series the electric current had been delivered to. The moving of the brushes reverses the flow of electricity through the energizing coils of the electromagnets and thereby reverses the polarity of the magnets.

Numeral 25 designates the base of the motor structure which has extending upward at one of its ends, bracket 26 forming a support for the permanent magnet supporting frame 26', having mounted thereon permanent magnets 1 adjacent the periphery thereof, and at its central portion, bearing 27 in which rotates the motor drive shaft 28 carrying the electromagnet supporting flange 29, having secured thereto electromagnets 2 energized by electricity from either the storage battery 16 or the dynamo 17, as previously described.

Numeral 30 refers to the motor drive shaft bearing supporting bracket located at the commutator portion of the rotatable elements, in which rotates the said drive shaft 28, the said shaft 28 having thereon coupling 31 whereby connection is made with the shaft of the dynamo 17 that furnishes electricity for energizing the magnet coils when the motor is in operation.

Should it be desired to operate the motor in one direction, and the storage battery having been connected, as described, to the reverse switch and the said switch having been closed for operation in that direction, the electric current will flow from the reverse switch through lead wire 23 to brush 14 and therefrom through the bar series 10 of the commutator, from the bar series 10 through lead wires 7 to the magnet energizing coil 3, from said coils 3 back to the brush 15 and commutator bar series 8 and switch 20.

Should it be desired to reverse the direction of rotation, the reverse switch is closed to its reverse position on its terminals. The electricity will then flow from the switch through the leads 23' to the brush 15, into the bar series 8, through the motor circuit in the reverse order to that first described, back to brush 14, through lead 24', to the reverse switch 20, and to the storage battery. The direction of rotation of the rotatable members of my motor may be changed or reversed by changing the location of the brushes riding on the commutator bar series as a change in contact of the brushes with the said bars, changes the time or location of change of pole reversal of the electromagnets, which reversal should take place during the first half of the space between the poles of the permanent magnets. By varying the time of the reversal from the first portion, or having the reversal take place immediately after the poles of the electromagnets, the speed of rotation will be slow and will increase as the brushes are set back on the commutator until the brushes are in such a position as will bring the reversal of polarity centrally between the poles of each permanent magnet. A further retardation of the brushes will stop rotation, and a still farther retardation of the brushes to a position will cause reversal of the electromagnet polarity before the first pole in advance on the permanent magnet is reached. A reversal in rotation will take place. This, however, is not desirable, it being best to cause reversal of polarity to cause reversal in rotation by changing the brush contact with the commutator bars within the last half of the space distance between the poles of permanent magnets. Likewise, a change in speed of rotation can be made by changing the time of polarity reversal while in the last half of the distance between the poles of the permanent magnets, the first half and last half meaning in the direction of electromagnetic rotation.

Having described my improved motor and its operation, the rights thereto which I desire to secure are set forth in the claims as follows:

1. In an electro-magnet motor having a commutator and brushes engaging the commutator for conducting electricity to and from the commutator, a rotatable shaft supporting the said commutator and having thereon and rotatable therewith a disc like rotor having secured thereto a plurality of magnets energised alternately to opposite plurality by electricity conducted from said commutator, a bearing supporting said shaft in spaced apart relation to said commutator and supported by a stationary disc having secured thereto a plurality of permanent magnets each having poles extending substantially parallel with and adjacent the poles of the magnets energised by electricity conducted from said commutator.

2. In an electro-magnet motor having a commutator and brushes engaging the commutator for conducting electricity to and from the commutator, a rotatable shaft supporting the said commutator and having thereon and rotatable therewith a rotor having secured thereto a plurality of magnets energised alternately to opposite polarity by electricity conducted from said commutator, a bearing rotatably supporting said shaft in spaced apart relation to said commutator and rotor and supported by a stator having secured thereto a plurality of permanent magnets each having poles extending substantially parallel with and adjacent the poles of the magnets energised by electricity conducted from said commutator.

3. In an electro-magnet motor, the combination comprising a rotatable shaft and a commutator thereon having two series of bars, brushes engaging each series of bars alternately as the commutator is rotated, a rotor having secured thereto a plurality of electro-magnets each having an energising coil having one of its ends connected to one series of the commutator bars and its other end connected to the other series of commutator bars whereby as the commutator is rotated electric current will flow first to and around the electro-magnets in one direction and thereby energise the magnets with their positive poles to one polarity, and as the commutator is rotated further the brushes will engage another set of commutator bars and the electric current will flow in the opposite direction and thereby energise the electro-magnets to opposite polarity, and a stator having a plurality of permanent magnets secured thereto with their side faces in close spaced apart relation to the magnet faces of the electro-magnets and substantially parallel thereto.

GARNETT G. SHELDON.